March 30, 1926.
G. W. BOLTON
FISHHOOK HOLDER
Filed Nov. 18, 1924
1,578,631
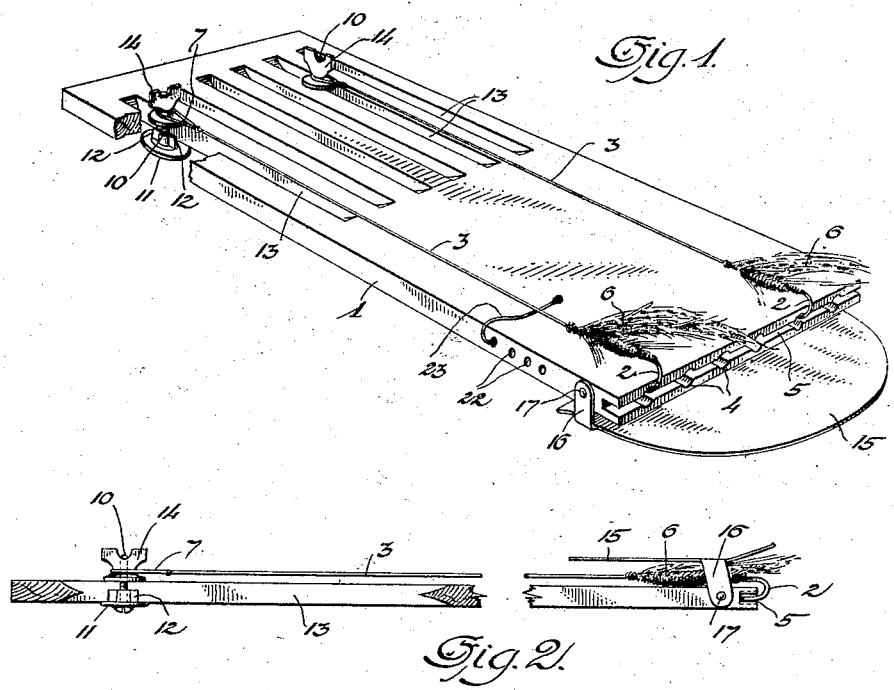
Inventor:
George W. Bolton Patented Mar. 30, 1926.

1,578,631

UNITED STATES PATENT OFFICE.

GEORGE W. BOLTON, OF HIGHLAND PARK, MICHIGAN.

FISHHOOK HOLDER.

Application filed November 18, 1924. Serial No. 750,668.

*To all whom it may concern:*

Be it known that I, GEORGE W. BOLTON, a citizen of the United States, residing at Highland Park, in the county of Wayne and State of Michigan, have invented certain new and useful Improvements in Fishhook Holders, of which the following is a specification, reference being had therein to the accompanying drawings.

This invention relates to devices for holding and protecting fish hooks and the like, its object being to provide a device which is simple in construction, cheap to manufacture, and adapted to detachably hold a plurality of fish hooks with their leaders, in such a manner as to prevent injury to the hooks or leaders, and also to prevent such hooks where a number are carried in the fisherman's kit, from becoming entangled and their leaders from becoming kinked or knotted, and when provided with lures, such as delicate flies, to protect these flies against injury. It is also an object to provide means whereby such hooks may be quickly and conveniently applied to or detached from the holder, and to provide a holder having certain other new and useful features, all as hereinafter more fully set forth.

With the above and other ends in view, the invention consists in providing a board or other comparatively rigid member having at one end thereof openings or other means to receive and protect the barbed or sharp barbless point of the hooks and adjacent its opposite end, means for detachably engaging loops in the ends of leaders attached to the hooks, whereby the hooks with their leaders may be detachably secured in spaced parallel relation upon the board with the leaders under sufficient tension to hold them straight and against kinking or becoming entangled with each other or with other fishing tackle. The invention further consists in certain other new and useful features, all as hereinafter more fully described and particularly pointed out in the appended claims, reference being had to the accompanying drawing, in which—

Figure 1 is a perspective view of a holder embodying the invention, and

Fig. 2 is a side elevation of the same, partly broken away and partly in longitudinal section.

In the drawing, 1 indicates a preferably flat rectangular member adapted to provide a support or place of attachment for a series of fish hooks 2 and their leaders 3. This support or carrying board may be of any desired size or shape and may be formed from any suitable material but, as shown, it consists of a flat wooden board of rectangular form and provided with a series of bores or openings 4 extending inwardly from one end of the board with these bores connected by a deep groove 5. These bores are provided to receive the barbed end portion of the hooks 3 and, as shown, these hooks may have lures, such as imitation flies 6 attached to their shank portions. The hooks shown are the usual commercial fly hooks provided with the usual leaders 3 having loops 7 at their free ends for attaching them to a fish line when used.

A plurality of hooks, either with or without flies, may be attached to the board by placing the barbed ends of the hooks in the openings 4 or in the groove 5 and then securing them in place by suitable detachable fastening means to engage the loops 7, such fastening means being movable longitudinally of the board to be engaged within the loops and then moved to stretch or place the leaders under tension and to hold the hooks within the openings in the end of the board. These adjustable fastenings may each comprise a screw-threaded stud bolt 10 having a flat head 11 at one end and formed with a rib or ribs 12 adjacent said head to engage within a longitudinal slot 13 in the board, the screw-threaded shank of the bolt projecting through the slot and being provided with a winged nut 14 to engage the upper side of the board and hold the stud in any position to which it may be adjusted along the slot. In attaching a fish hook to the holder, the bolt 10 may be quickly loosened by turning its thumb nut and then the bolt moved along the slot 13 a portion where the end loop in the leader of the hook may be engaged over the thumb nut. Then by again moving the bolt along the slot, the leader may be drawn straight and tight to hold the hook within its opening in the end of the board and to prevent kinking or knotting of the leader. Since the leaders are drawn taut they can dry in this condition and thus be in good form for use. The points of the hooks are thus protected and their leaders held straight and against becoming entangled with others as with other fishing tackle and the hooks may be readily placed upon or taken from the holder.

When the fly-hooks are to be carried by the holder, it may be found desirable to provide a shield 15 for protecting these delicately constructed flies against injury, and this shield may be in the form of a sheet metal plate hingedly connected to the end of the board so that it may be turned to a position to cover and protect the flies or swung to a position to permit the ready removal of the hooks from the board. In the construction shown, the shield 15 is formed with ears 16 having openings for pivot pins 17 driven into the side edges of the board near the slotted end thereof. Any suitable form of shield and means for attaching the same to the board may be employed which will permit of the ready swinging of the shield into and out of position over the flies to cover the same as they lie upon the upper face of the board.

The guides which permit of adjustment of the bolts are in the form of slots 13 in the board and these guides are of sufficient length to provide for attaching leaders and hooks of different lengths to the board and for the movement of the attaching means to draw the leaders taut. The leaders are therefore firmly held taut upon the board with the barbed points of their hooks engaged within the openings in the end of the board to effectually protect these points, and if the leaders are mounted on the board or member 1 when wet, they are dried out and left in a straight condition for use. The holder may therefore, be placed in the fisherman's kit with other tackle without danger of injury to the hooks or leaders, and when these leaders and hooks are removed from the board there will be no tendency of the leaders to curl, due to their having been held under tension and straight. The shield 15 also protects the fine feathery parts of the flies against injury while being carried in the kit or in the fisherman's pocket.

The board or member 1 may have its side edge or edges provided with a series of openings 22, for leaderless hooks 23 that may have barbs or simply sharp points, the hooks being forced into the openings 22 to engage in the board or member and thus be held in engagement therewith. It is therefore possible to carry different kinds of hooks, and if the openings 22 are placed with that end of the board or member 1 opposite the shield 15, it is obvious that another shield can be provided to protect and assist in preventing displacement of the leaderless hooks 23.

Obviously any suitable means for adjustably and detachably holding the leaders under tension may be employed and other changes within the scope of the appended claims, may be made without departing from the spirit of the invention.

Having thus fully described my invention, what I claim is:

1. A holder for fish hooks and their leaders, comprising a supporting member having means at one end thereof to receive the barbed point of a hook, and nut-equipped bolts adjacent the opposite end of said supporting member adapted to have the nuts thereof engage a loop in the leader, said means being adjustable longitudinally of said support to exert a pull upon said leader to hold the same taut and to hold said barbed point of the hook engaged with said means upon the support.

2. A holder for fish hooks including a board having openings bored inwardly from an end face of the board to receive the curved and barbed end portions of fish hooks with the shank portions of the hooks lying upon the upper surface of the board, a plurality of guides extending longitudinally of said board adjacent the end thereof opposite that having the openings to receive the hooks, and means to engage the looped ends of leaders on said hooks and adjustable along said guides and adapted by a screw action to be frictionally held in adjusted position on said guides.

3. A holder for fly hooks and their leaders, comprising a board provided with a plurality of holes bored inwardly from the end of the board to receive the barbed and curved end portions of hooks with the shanks of the hooks and their flies lying upon the upper surface of the board adjacent said end, means for holding the several leaders for the hooks in spaced parallel relation upon the upper side of the board, and a shield to cover the flies of the hooks.

4. A holder for fly hooks as characterized in claim 3, and wherein said shield is pivotally attached to the board to be swung thereon from over said flies.

5. A holder for fish hooks and their leaders, which holder consists of a flat board having openings in one end thereof to receive the barbed ends of the hooks, and provided with a series of longitudinal slots adjacent the opposite end of the board, and nut-equipped bolts adjustable along said slots with the bolt nuts arranged for engaging looped ends of leaders.

6. A holder for fish hooks and their leaders, comprising a slotted board having one end thereof fashioned to receive the barbed ends of the hooks, and bolts passing through and adjustable within said slots in said board, said bolts being provided with nuts to engage in the hook leaders on the upper side of the board and hold said nuts in the position to which they are adjusted along said slots.

7. A holder for fly hooks, comprising a board adapted to have the pointed ends of said hooks held in the edge of the board and a swingable shield carried by opposite side edges of the board and adapted in a closed position to extend over the fly portion of the hooks and in an open position extending under said board.

In testimony whereof I affix my signature.

GEORGE W. BOLTON.